(12) United States Patent
Kirsch

(10) Patent No.: US 6,895,424 B2
(45) Date of Patent: May 17, 2005

(54) METHOD AND CIRCUIT FOR ALIGNMENT OF FLOATING POINT SIGNIFICANTS IN A SIMD ARRAY MPP

(75) Inventor: Graham Kirsch, Hants (GB)

(73) Assignee: Micron Technology, Inc., Boise, ID (US)

( * ) Notice: Subject to any disclaimer, the term of this patent is extended or adjusted under 35 U.S.C. 154(b) by 531 days.

(21) Appl. No.: 09/874,307

(22) Filed: Jun. 6, 2001

(65) Prior Publication Data

US 2002/0194238 A1 Dec. 19, 2002

(30) Foreign Application Priority Data

May 21, 2001 (GB) .............................. 0112269

(51) Int. Cl.[7] .......................... G06F 7/42; G06F 15/00
(52) U.S. Cl. ...................................... 708/505; 708/209
(58) Field of Search ................................ 708/495, 505, 708/209

(56) References Cited

U.S. PATENT DOCUMENTS

| | | | |
|---|---|---|---|
| 4,807,172 A | * | 2/1989 | Nukiyama .................. 708/209 |
| 5,247,471 A | | 9/1993 | Hilker et al. |
| 5,646,875 A | | 7/1997 | Taborn et al. |
| 5,954,790 A | * | 9/1999 | Wong .......................... 708/505 |
| 6,067,556 A | * | 5/2000 | Menezes ..................... 708/505 |

OTHER PUBLICATIONS

Research Disclosure vol. 441, article 006, Jan. 2001 (Westbourne), anon, "Unified SIMD/scalar floating point adder design".

IBM Technical Disclosure Bulletin, No. NN8607699, Jul. 1986 (US), "Using a common barrel shifter for operand normalization, operand alignment and operand unpack and pack in floating point", see whole document.

* cited by examiner

Primary Examiner—Tan V Mai
(74) Attorney, Agent, or Firm—Dickstein Shapiro Morin & Oshinsky LLP

(57) ABSTRACT

The processing elements of a single instruction multiple data (SIMD) massively parallel processor (MPP) are provided with two register blocks. One register block includes logic for performing limited left shifting, while the other register block includes logic for performing limited right shifting. A method is disclosed for using the registers blocks with their associated logic to perform floating point significant alignment and normalization. The limited shifting logic occupies less die space than a full feature barrel shifter, thereby permitting a greater number of processing elements.

36 Claims, 5 Drawing Sheets

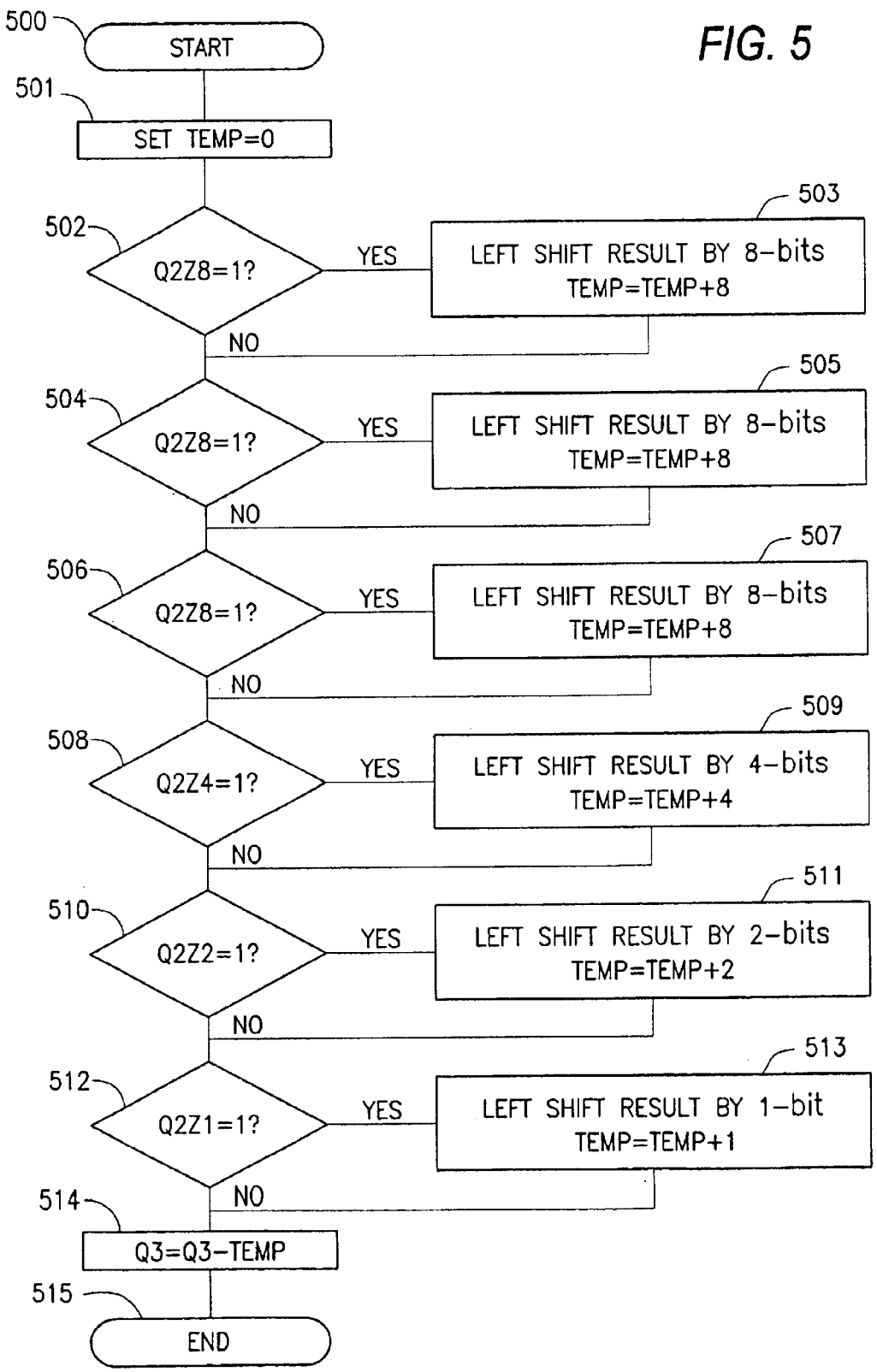

METHOD AND CIRCUIT FOR ALIGNMENT OF FLOATING POINT SIGNIFICANTS IN A SIMD ARRAY MPP

The following application is related to application Ser. No. 09/874,044 filed on Jun. 6, 2001, entitled "Method and Circuit for Normalization of Floating Point Significants in a SIMD Array MPP", the disclosure of which is incorporated by reference.

FIELD OF THE INVENTION

The present invention relates to the field of massively parallel processing systems, and more particularly to a method and apparatus for efficiently normalizing and aligning the significant portion of a floating point number in a single instruction multi data massively parallel processing system.

BACKGROUND OF THE INVENTION

The fundamental architecture used by all personal computers (PCs) and workstations is generally known as the von Neumann architecture, illustrated in block diagram form in FIG. 1. In the von Neumann architecture, a main central processing unit (CPU) 10 is coupled via a system bus 11 to a memory 12. The memory 12, referred to herein as "main memory", also contains the data on which the CPU 10 operates. In modern computer systems, a hierarchy of cache memories is usually built into the system to reduce the amount of traffic between the CPU 10 and the main memory 12.

The von Neumann approach is adequate for low to medium performance applications, particularly when some system functions can be accelerated by special purpose hardware (e.g., 3D graphics accelerator, digital signal processor (DSP), video encoder or decoder, audio or music processor, etc.). However, the approach of adding accelerator hardware is limited by the bandwidth of the link from the CPU/memory part of the system to the accelerator. The approach may be further limited if the bandwidth is shared by more than one accelerator. Thus, the processing demands of large data sets are not served well by the von Neumann architecture. Similarly, as the processing becomes more complex and the data larger, the processing demands may not be met even with the conventional accelerator approach.

Referring now to FIG. 2, an alternative to the von Neumann architecture is the single instruction multiple data (SIMD) massively parallel processor (MPP) system. A MPP system differs from a von Neumann system by using a large number of processors, called processing elements (PE) 200, coupled to a communications network 15. The communications network 15 permit each PE 200 to exchange data with other PEs 200. Additionally, the PEs 200 may read or write to main memory 12 via an array-to-memory bus 13, or receive commands or instructions from CPU 10 via bus 11. Although the CPU 10 may perform some processing, in a SIMD MPP system, the array of PEs 14, comprising the PEs 200 and its communications network 15, perform most of the computations. The CPU 10 functions in a supporting role.

In a SIMD MPP, each PE operates on the same instruction, at the same time, but on different pieces of data. Since the PEs in a SIMD array operate in lockstep, data dependent conditional operations cannot be performed by branching, as would be done in a conventional processor. Instead, each PE can decide whether to store the result of an operation either in an internal register or in a memory dependent upon a condition generated within the PE from data local to the PE. This technique is known as "activity control" and is a very powerful method for performing data dependent decisions in a parallel computer which operates on a single stream of instructions.

Most SIMD MPPs utilize relatively simple processors for PEs 200. For example, short integer PEs 200, such as 8-bit integer processors may be used. SIMD MPPs utilize these simple processors in order to increase the number of PEs 200 which can be integrated upon a single silicon die. High performance is achieved by the use of a large number of simple PEs 200, each operating at a high clock speed.

The use of short integer PEs 200 mean that floating point operations may require several clock cycles to complete. In many computer systems, floating point numbers are often stored in a manner consistent with the IEEE-754 standard. In particular, the IEEE-754 standard stores single precision floating point number as three binary fields taking the format of:

$$(-1)^s \times 2^{(e-127)} \times (1.f) \qquad (1)$$

wherein:
s is a single bit representing the sign of the floating point number.
e is an 8-bit unsigned integer representing a biased exponent. e is said to represent a biased exponent because the actual exponent being represented is equal to e −127. Although an 8-bit unsigned integer may range from 0–255, and thereby permitting exponents in the range from −127 (i.e., −127=0−127) to +128 (i.e., 128=255−127), the IEEE-754 standard limits the range of usable exponents to exclude −127 and +128.
1.f is a 24-bit significant field in a "normalized" format, i.e., a bit field in which the most significant bit (MSB) is the first digit left of the binary point and in which the most significant bit is set to one. Since the most significant bit of a normalized number is understood to be 1, there is no need to store the most significant bit.

Data which have biased exponents of 0 and 255 are used to represent special conditions and the number zero. The IEEE-754 standard represents the number zero using a biased exponent of 0 (i.e., for the single precision format, the exponent equals −127) and a significant field of 00000000000000000000000$_2$. (In the special cases of zero and non-normalized numbers, indicated by the exponent being 0, the most significant bit of the significant is not taken to be a 1.)

Under the IEEE-754 standard, single extended, double, and double extended precision numbers are stored in similar format, albeit using different sized exponents and significants. For example, double precision numbers use a 10-bit biased exponent field with representable exponents ranging from −1022 to 1023 and a significant having 53 bits.

In order to perform arithmetic operations on floating point number stored in the IEEE-754 format, the floating point numbers first need to be separated, or "demerged", to extract the sign bit, the exponent, and the significant. Once these fields have been extracted, they can be operated upon in order to perform the arithmetic operation. For example, multiplying two floating point number includes multiplying the significants and adding the exponents. For addition and subtraction, the significant fields of both operands must be properly aligned. This may require shifting the significant field and adjusting the exponent field of one of the operands until both operands have the same exponent field. This process is known as alignment.

In conventional computer systems, alignment is normally performed using standard shifting logic, such as barrel shifters. Shifting logic is used in conventional computer systems because they have adequate speed and they do not consume a significant amount of silicon real estate in comparison to the other circuitry in a complex CPU 10. However, in a SIMD MPP using simple PEs 200, standard shifting logic such as barrel shifters would significantly increase the size of the PEs 200 and also be too slow. Accordingly, there is a desire and need for a way to efficiently perform alignment of floating point significants in a SIMD MPP environment.

SUMMARY OF THE INVENTION

The present invention is directed at a processing element of a SIMD MPP which can efficiently perform the alignment process commonly used when performing arithmetic operations on floating point numbers. The PEs of the SIMD MPP include two groups of registers. One of the groups is known as the M block and includes a plurality of registers and logic which permits limited right shifting (e.g., 1-, 2-, 4-, and 8-bit right shifts are supported) the contents of the registers. A method is used with the limited right shifting ability of the M block registers to align significants. The other group of registers is known as the Q block and includes a plurality of registers and logic which permits limited left shifting of the contents of the registers.

BRIEF DESCRIPTION OF THE DRAWINGS

The foregoing and other advantages and features of the invention will become more apparent from the detailed description of the preferred embodiments of the invention given below with reference to the accompanying drawings in which:

FIG. 5 is a flowchart which illustrates how the PE of the present invention normalizes significant data.

DETAILED DESCRIPTION OF THE INVENTION

Figure 1:
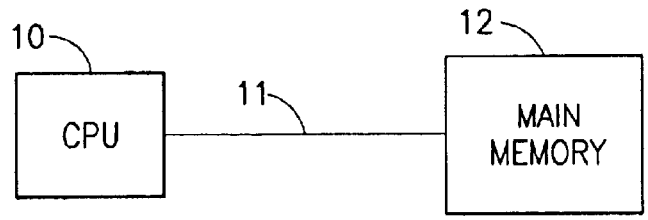
FIG. 1 is a block diagram of a prior art von Neumann architecture computer system.
Figure 2:
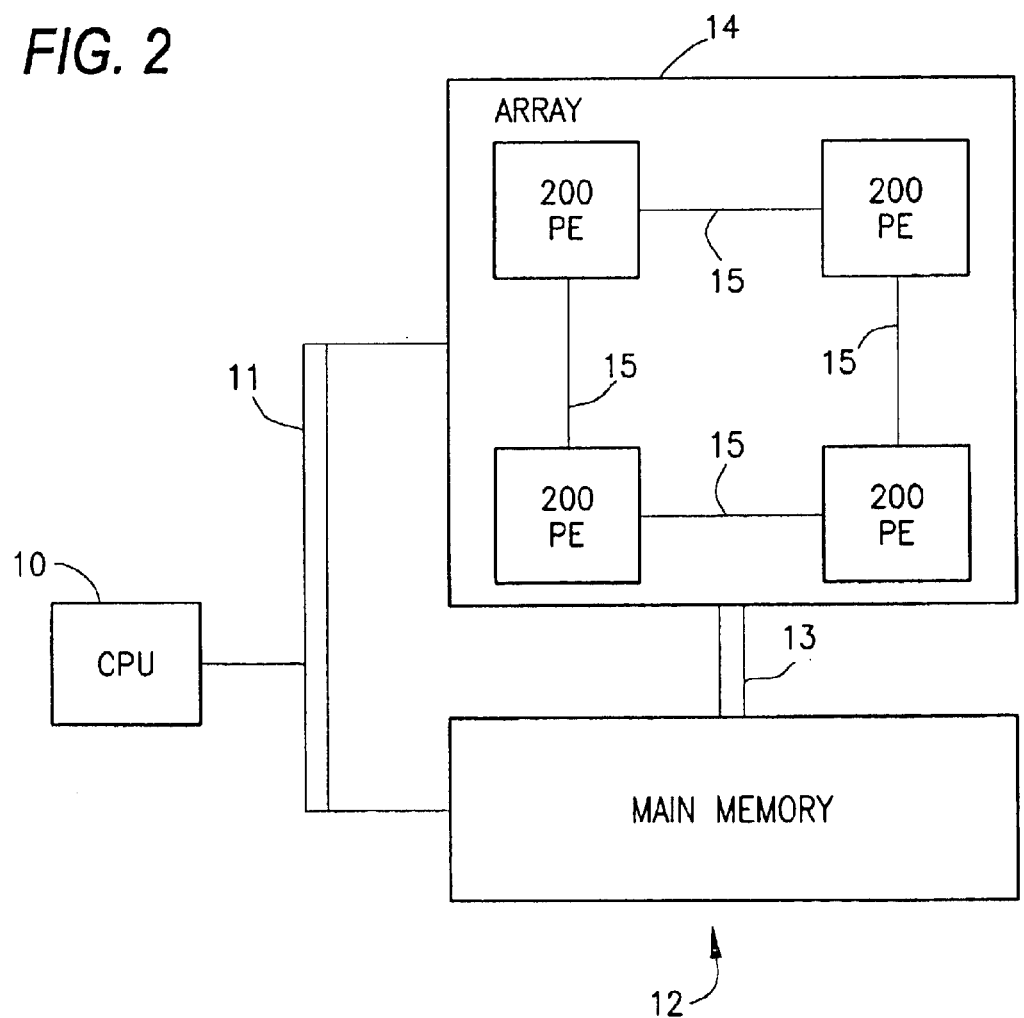
FIG. 2 is a block diagram of a SIMD MPP computer system.
Figure 3:
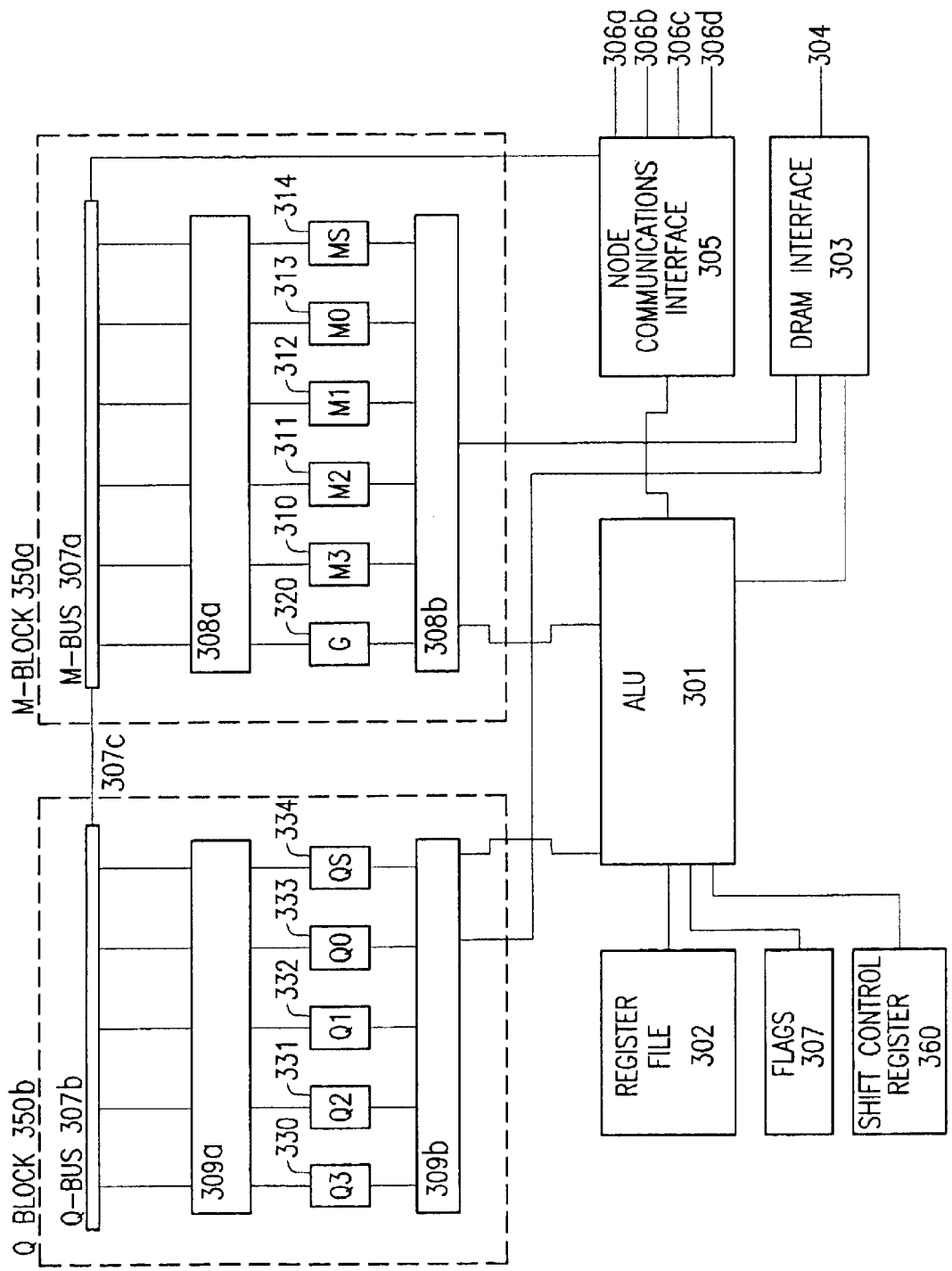
FIG. 3 is a block diagram of one of the PEs in the SIMD MPP computer system in accordance with the principles of the present invention.

Now referring to the drawings, where like reference numerals designate like elements, there is shown in FIG. 3 a block diagram of a PE 200 in accordance with the principles of the present invention. The PE 200 is divided into several functional blocks, including an ALU 301, which is coupled to a Node Communications Interface 305 and a DRAM Interface 303. The Node Communications Interface 305 is used by the PE 200 to send and receive messages to the four other PE 200 adjacent to the present PE 200, over signal lines 306a, 306b, 306c, and 306d. The DRAM Interface 303 is used by the PE 200 to read and write to a main memory 12. The ALU 301 is also coupled to a series of registers, including a register file 302 used to store data, a series of flag registers 307, and a shift control register ("SCR") 360. In the exemplary embodiment, the SCR 360 is an 8-bit register with the most significant bit designated bit 7 and the least significant bit designated bit 0. The function of the flag registers 307 and the SCR 360 will be explained later. The PE 200 also includes two registers blocks, namely the M Block 350a and the Q Block 350b.

The M block 350a includes a bus called the M Bus 307a which is coupled to the Node Communications Interface 305. The M bus 307a is also coupled, via logic circuit 308a to a plurality of registers. These registers include the M3 310, M2 311, M1 312, M0 313, and MS 314 registers. In some embodiments an optional a G register 320 may also be present. The G register 320 may be used, for example, to store extension bits for use in higher precision calculations. In one exemplary embodiment, registers M3 310, M2 311, M1 312, and M0 313 are 8-bit registers while register MS 314 is a single bit register. Logic circuit 308b couples registers M3 310, M2 311, M1 312, M0 313, MS 314, and G 320 to Q Bus 307b, ALU 301 and DRAM Interface 304. The logic circuits 308a and 308b represent conventional logic circuits such as a network of multiplexers, which permit the registers M3 310, M2 311, M1 312, M0 313, MS 314, and G 320 to receive and transmit data in a manner which will be described in additional detail.

Additionally, logic circuits 308a, 308b are also capable of demerging an IEEE-754 formatted number into its sign, biased exponent, and significant fields. In particular, the sign is stored in register MS 314, the biased exponent is stored in M3 310, and the significant is stored in registers M2 311 (most significant byte), M1 312, and M0 313 (least significant byte). The logic circuits 308a, 308b may also be capable of setting registers M2 311, M1 312, and M0 313 to zero. Finally, logic circuits 308a, 308b also permit data stored in registers M2 311 and M1 312 to be right shifted in increments of 1, 2, 4, and 8 bits. The M registers (i.e., MS 314, M0 313, M1 312, M2 311, and M3 310) and the Q registers (i.e., QS 344, Q0 333, Q1 332, Q2 331, and Q3 330) are coupled via signal line 307c. This permits the contents of the M registers to be transferred in one clock cycle to corresponding Q registers in the Q block.

The Q block 350b is similar to the M block 350a. The Q block has an bus known as the Q bus 307b. The Q bus 307b is not coupled to the Node Communications Interface 305. Instead, the Q bus 307b is coupled via signal line 307c to the M Bus 307a of the M block 350a. The Q block 350b include a series of Q registers, namely QS 334, Q0 333, Q1 332, Q2 331, and Q3 330. In the exemplary embodiment register QS is a single bit register while registers Q0 333, Q1 332, Q2 331, and Q3 330 are 8-bit registers. The Q block 350b has logic circuits 309a, 309b which function in a manner similar to logic circuits 308a, 308b of the M block 350a. One significant difference between the two sets of logic circuits, 308a/308b and 309a/309b, however, is that while logic circuits 308a, 308b permit data stored in registers M2 and M1 to be right shifted in 1, 2, 4, and 8 bit increments, logic circuits 309a, 309b permit data in registers Q2 331 and Q1 332 to be left shifted, in the same increments.

The PE 200 also includes a flag register 307 which contain a plurality of flags. These flags default to being set to zero, unless a specific conditions resets them to one. In the exemplary embodiment there are four flags named Q2Z8, Q2Z4, Q2Z2, and Q2Z1, which function as described below. Flag Q2Z8 is one if all eight bits of register Q2 331 are zero. Flag Q2Z4 is one if the four most significant bits of register Q2 331 are zero. Flag Q2Z2 is one if the two most significant bits of register Q2 331 are both zero. Finally, flag Q2Z1 is one if the most significant bit of register Q2 331 is zero.

The PE 200 performs floating point arithmetic operations by first demerging the two IEEE-754 formatted operands.

This is done by loading the first operand into the M block 350a. The operand may be loaded from the Node Communications Interface 305 if the operand is sent from an adjacent PE 200. Alternatively, the operand may be loaded from the DRAM Interface 303 if the operand had been loaded into the main memory 12. As mentioned previously, the logic circuits 308a, 308b in M block 350a demerge an IEEE-754 formatted operand into its sign, biased exponent, and significant fields by storing the sign field in register MS 314, the biased exponent in register M3 310, and the significant in registers M2 311 and M1 312. Once the first operand has been demerged, it is transferred via signal line 307c to the Q block 350b. The second operand is then loaded to the M block 350a and demerged. At this point, the two demerged successive operands are in the M block 350a and the Q block 350b.

Depending on the type of arithmetic operation which is to be performed (e.g., addition or subtraction may require aligning the significant and correspondingly adjusting the exponent) further reformatting operation may need to be performed on the operands stored in the Q block 350b and M block 350a. In particular, the PE 200 of the present invention aligns the operands in the following manner. First the exponent value of the two operands are compared by subtracting them and storing the result in the shift control register (SCR) 360. More specifically: SCR=M3-Q3. The result of the calculation can be interpreted in the following manner:

- If the number stored in the SCR register 360 is equal to zero, then the two exponents are identical and no alignment is required.
- If the number stored in the SCR 360 is greater than zero, then the two operands may be aligned by shifting the contents of the M registers 310-313 to the right. The amount to be shifted is the number stored in the SCR register 360.
- If the number stored in the SCR register 360 is less than zero, then the two operands may be aligned by shifting the contents of the Q registers 330-333 to the right. The amount to be shifted is the negative of the number stored in the SCR register 360.

However, as previously described, only the M block is capable of right shifting. Thus, if the SCR contains a negative value, the contents of the M block 305a and the Q block 305b needs to be swapped and the value in the SCR negated (so that it becomes a positive number).

The exponent of the operand stored in the M block 350a is then adjusted to its post alignment value. More specifically, the exponent, which is stored in M3, takes the following value:

$$M3 = M3 - SCR \qquad (2)$$

Figure 4A:
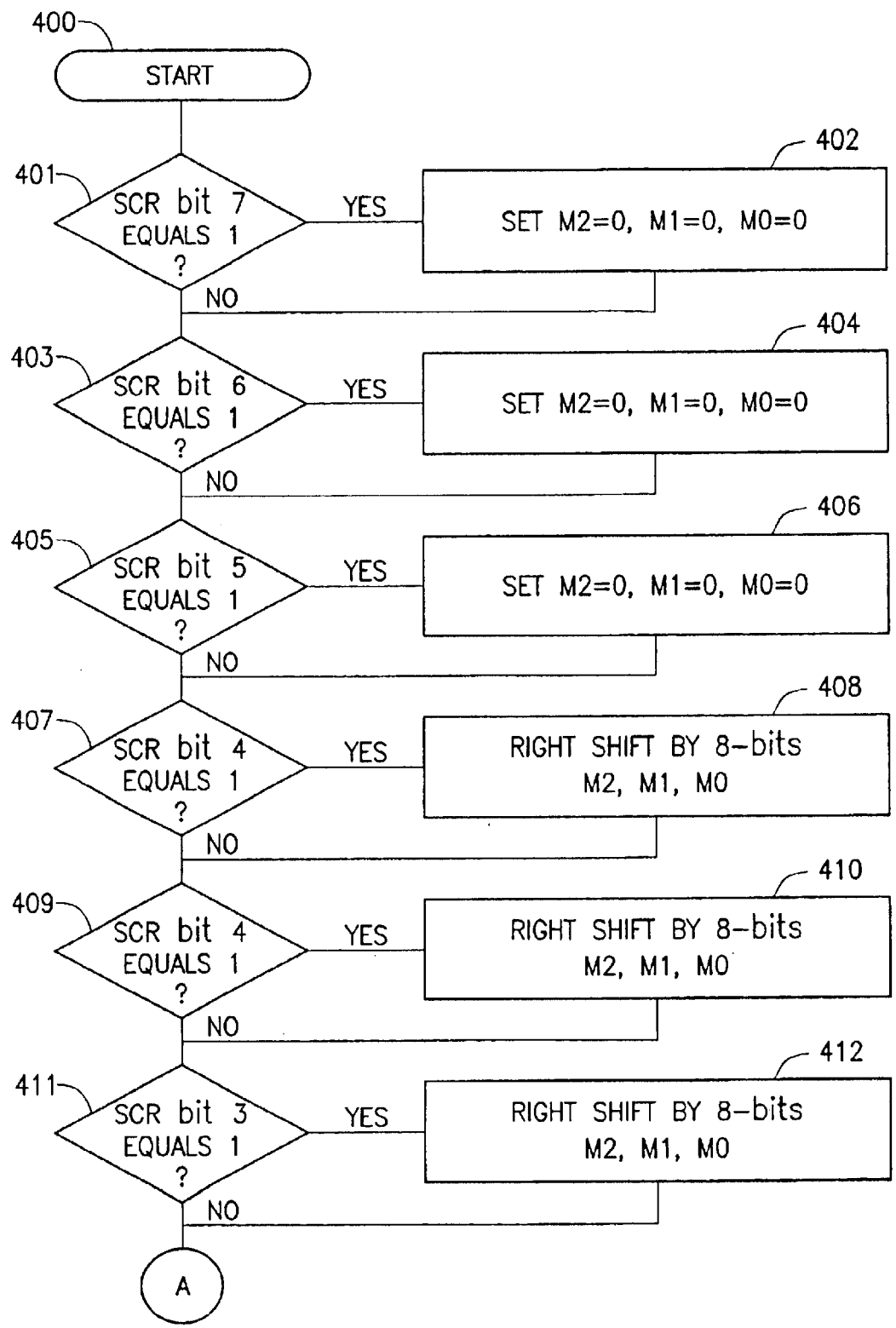
FIGS. 4A and 4B are a flow chart which illustrate how the PE of the present invention aligns significant data.
Figure 4B:
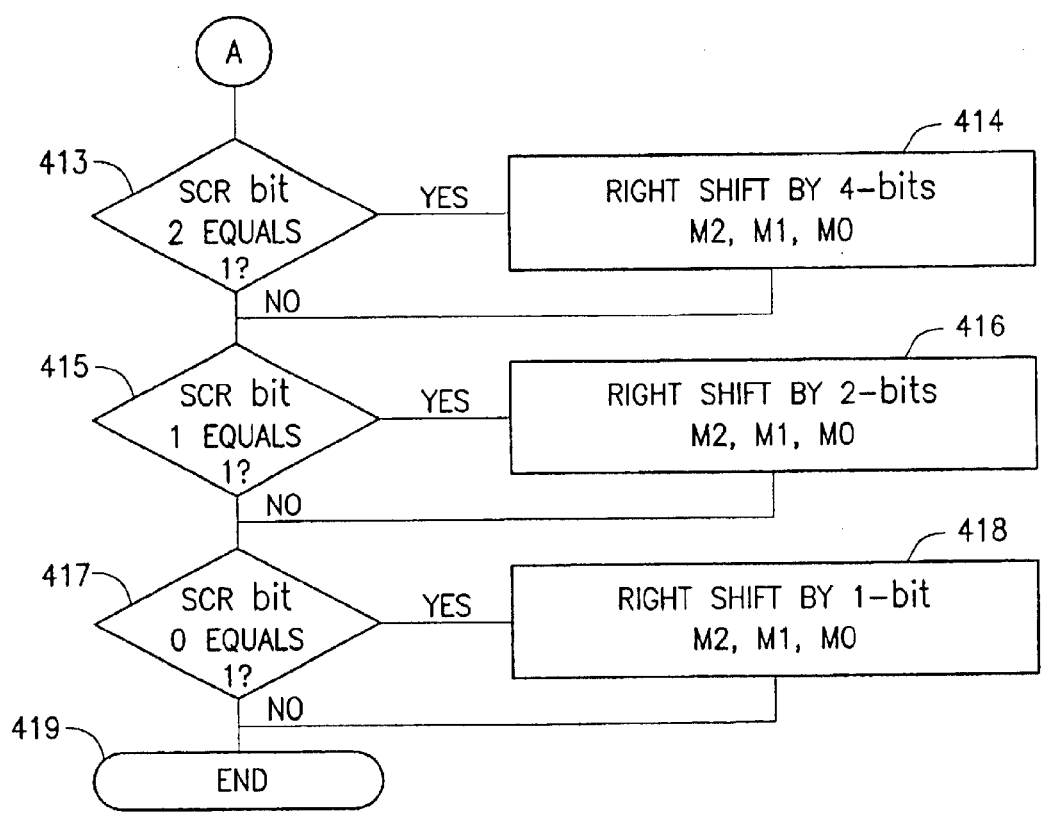

The alignment of the significant is performed according to the nine steps described below and illustrated in FIGS. 4A and 4B as steps 400-419.

(Step 1) If bit 7 of the SCR 360 is a one (FIG. 4A, 401), this means the significant stored in registers M2 311, M1 312, and M0 313 needs to be right shifted by at least 128-bits. Since the three 8-bit registers M2 311, M1 312, and M0 313 store at most 24 bits, the shifted result will underflow if the condition is true. Thus, registers M2 311, M1 312, and M0 313 are each set to zero (FIG. 4A, 402).

(Step 2) If bit 6 of the SCR 360 is a one (FIG. 4A, 403), this means the significant stored in registers M2 311, M1 312, and M0 313 needs to be shifted by at least 64 bits. As with step (1), if the condition is true an underflow will result. Thus, registers M2 311, M1 312, and M0 313 are each set to zero (FIG. 4A, 404).

(Step 3) If bit 5 of the SCR 360 is a one (FIG. 4A, 405), this means the significant stored in registers M2 311, M1 312, and M0 313 needs to be shifted by at least 32 bits. As with steps (1) and (2), if the condition is true an underflow will result. Thus, registers M2 311, M1 312, and M0 313 are each set to zero (FIG. 4A, 406).

(Step 4) If bit 4 of the SCR 360 is a one (FIG. 4A, 407), this means a shift of at least 16-bits is required. As previously explained, the logic 308 only permits right shifting of the M block registers in increments of up to 8-bits. Thus, a 16-bit right shift will need to be performed as two separate 8-bit right shifts. Thus, registers M2 311, M1 312, and M0 313 are each right shifted by 8-bits (FIG. 4A, 408).

(Step 5) If bit 4 of the SCR 360 is a one (FIG. 4A, 409), this means the shift of at least 16-bits is required. Another 8-bit right shift is performed on registers M2 311, M1 312, and M0 313 (FIG. 4A, 410) so that steps (4) and (5) collectively result in a 16-bit right shift.

(Step 6) If bit 3 of the SCR 360 is a one (FIG. 4A, 411), this means a shift of at least 8-bits is required. Thus, each of registers M2 311, M1 312, and M0 313 is right shifted by 8-bits (FIG. 4A, 412).

(Step 7) If bit 2 of the SCR 360 is a one (FIG. 4B, 413), this means a shift of at least 4-bits is required. Thus, each of registers M2 311, M1 312, and M0 313 is right shifted by 4-bits (FIG. 4B, 414).

(Step 8) If bit 1 of the SCR 360 is a one (FIG. 4B, 415), this means a shift of at least 2-bits is required. Thus, each of registers M2 311, M1 312, and M0 313 is right shifted by 2-bits (FIG. 4B, 416).

(Step 9) If bit 0 of the SCR 360 is a one (FIG. 4B, 417), this means a single bit shift is required. Thus, each of registers M2 311, M1 312, and M0 313 is right shifted by 1-bit (FIG. 4B, 418).

Note that logically, once any one of the conditionals in steps (1), (2), or (3) is met, the final result of the 9-step sequence is known when registers M2 311, M1 312, and M0 313 are each set to zero. However, in a SIMD MPP environment, different PEs 200 operate on different data using the same instruction stream. Thus, each PE should execute each of the 9 steps described above to ensure that the data being operated on by each PE 200 is correctly aligned. The above described method therefore permits a single stream of instructions to align IEEE-754 formatted floating point numbers in each PE 200 in the array 14. Each PE 200 only requires shifting logic, such as logic circuits 308a, 308b, which can perform 1, 2, 4, and 8-bit right shifts. The logic circuits 308a, 308b required are significantly smaller and faster than a full 24-bit barrel shifter, thereby permitting a larger number of PEs 200 to be integrated upon a single chip. In the preferred embodiment, each of the nine steps can be performed in a single clock cycle, thereby requiring only 9 clock cycles to align every PE 200 in the array 14.

For example, suppose the array 14 has two PE 200s, with and their registers are set as follows (all register values are specified in binary):

|     | First PE   | Second PE  |
| --- | ---------- | ---------- |
| SCR | 0100 0001  | 0000 1011  |
| M2  | 1000 1000  | 1010 1111  |
| M1  | 1100 1100  | 0000 0101  |
| M0  | 1110 1110  | 1110 0011  |

The data in the two PEs 200 would then be aligned in the following manner:

In step (1), for both PEs 200, bit 7 of the SCR 360 is equal to zero, so no further processing is performed in step (1). The state of the registers after step (1) is:

|     | First PE   | Second PE  |
| --- | ---------- | ---------- |
| SCR | 0100 0001  | 0000 1011  |
| M2  | 1000 1000  | 1010 1111  |
| M1  | 1100 1100  | 0000 0101  |
| M0  | 1110 1110  | 1110 0011  |

In step (2), for the first PE 200, bit 6 of the SCR 360 is equal to one, so the contents of M2, M1, and M0 are each set to zero. For the second PE 200, bit 6 of the SCR 360 is equal to zero, so no further processing is performed in step (2). The state of the registers after step (2) is:

|     | First PE   | Second PE  |
| --- | ---------- | ---------- |
| SCR | 0100 0001  | 0000 1011  |
| M2  | 0000 0000  | 1010 1111  |
| M1  | 0000 0000  | 0000 0101  |
| M0  | 0000 0000  | 1110 0011  |

In step (3), for both PEs 200, bit 5 of the SCR 360 is equal to zero so no further processing is performed in step (3). The state of the registers after step (3) is:

|     | First PE   | Second PE  |
| --- | ---------- | ---------- |
| SCR | 0100 0001  | 0000 1011  |
| M2  | 0000 0000  | 1010 1111  |
| M1  | 0000 0000  | 0000 0101  |
| M0  | 0000 0000  | 1110 0011  |

In step (4), bit 4 of the SCR 360 for both PEs 200 are equal to zero so no further processing is performed in step (4). The state of the registers after step (4) is:

|     | First PE   | Second PE  |
| --- | ---------- | ---------- |
| SCR | 0100 0001  | 0000 1011  |
| M2  | 0000 0000  | 1010 1111  |
| M1  | 0000 0000  | 0000 0101  |
| M0  | 0000 0000  | 1110 0011  |

In step (5), bit 4 of the SCR 360 for both PEs 200 are equal to zero so no further processing is performed in step (5). The state of the registers after step (5) is:

|     | First PE   | Second PE  |
| --- | ---------- | ---------- |
| SCR | 0100 0001  | 0000 1011  |
| M2  | 0000 0000  | 1010 1111  |
| M1  | 0000 0000  | 0000 0101  |
| M0  | 0000 0000  | 1110 0011  |

In step (6), for the first PE 200, bit 3 of the SCR 360 is equal to zero so no further processing is performed in step (6). For the second PE 200, bit 3 of the SCR 360 is equal to one, so a 8-bit right shift is performed. The state of the registers after step (6) is:

|     | First PE   | Second PE  |
| --- | ---------- | ---------- |
| SCR | 0100 0001  | 0000 1011  |
| M2  | 0000 0000  | 0000 0000  |
| M1  | 0000 0000  | 1010 1111  |
| M0  | 0000 0000  | 0000 0101  |

In step (7), for both PEs 200, bit 2 of the SCR 360 is equal to zero so no further processing is performed in step (7). The state of the registers after step (7) is:

|     | First PE   | Second PE  |
| --- | ---------- | ---------- |
| SCR | 0100 0001  | 0000 1011  |
| M2  | 0000 0000  | 0000 0000  |
| M1  | 0000 0000  | 1010 1111  |
| M0  | 0000 0000  | 0000 0101  |

In step (8), for the first PE 200, bit 1 of the SCR 360 is equal to zero so no further processing is performed in step (8). For the second PE, bit 1 of the SCR 360 is equal to one so a 2-bit right shift is performed. The state of the registers after step (8) is:

|     | First PE   | Second PE  |
| --- | ---------- | ---------- |
| SCR | 0100 0001  | 0000 1011  |
| M2  | 0000 0000  | 0000 0000  |
| M1  | 0000 0000  | 0010 1011  |
| M0  | 0000 0000  | 1100 0001  |

In step (9), for both PE 200, bit 0 of the SCR 360 is equal to one so a 1-bit right shift is performed in each PE. The state of the register after this final step, which result in alignment for both PEs 200, is:

|     | First PE   | Second PE  |
| --- | ---------- | ---------- |
| SCR | 0100 0001  | 0000 1011  |
| M2  | 0000 0000  | 0000 0000  |
| M1  | 0000 0000  | 0001 0101  |
| M0  | 0000 0000  | 1110 0000  |

Once the significant has been aligned (if necessary), the ALU 301, which is coupled to the M block 350a via logic circuit 308b and the Q block 350b via logic circuit 309b, can perform the arithmetic operation in an ordinary manner. For example, the significants may be added, subtracted, or multiplied. For addition and subtraction the exponents of the operands are equal and do not require adjustment. For multiplication, the exponents are summed. The result of the arithmetic operation are stored in the Q block 350b. As usual, the most significant byte of the result is stored in register Q2, and lesser significant bytes of the results are progressively stored in registers Q1 and Q0. If there are additional bits of the result which needs storing, the lesser significant bytes of the results may be stored in the G register 320 and the M0 register 313 of the M Block 350, and additional lesser significant bytes of the results may be stored in the register file.

Thus, the present invention provides an apparatus and a method for normalizing the significant portion of an floating point number, such as those which follow the IEEE-754 floating point standard, in a SIMD MPP environment. The present invention is advantageous in that each PE 200 of the array 14 is not required to have a full feature shifter, such as a barrel shifter. Instead, a faster but more limited shifting logic, such as logic circuits 308a, 308b, which are only capable of shifting the significant data by 1-, 2-, 4-, or 8-bits are used in combination with a shift control register 360, under a nine step procedure to align the significant. Ideally, the instruction or instructions which correspond to each of the nine steps can be executed by a PE 200 in a single clock cycle. Since in a SIMD environment each PE 200 in the array 14 executes the same instruction at the same time, every significant in the array 14 can be aligned in as little as nine clock cycles.

Although the invention has been discussed and illustrated in the context of a 8-bit shift control register and shifting circuits which are capable of shifting significant data by 1-, 2-, 4-, and 8-bits, the invention is not so limited and may be generalized as follows: The flexibility of the right shifting circuitry and the width of the shift control register may be varied. The shift control register can be J+1 bits wide, wherein J is a positive integer of at least 7 with the most significant bit being bit J and the least significant bit being bit 0. The right shifting circuitry can be capable of right shifting the significant by $2^0, 2^1, 2^2, \ldots, 2^N$ bits, wherein N is a range of integers between 0 and M, wherein M is a positive integer of at least 3 and wherein $2^{(M+2)}$ is greater than the width of the significant.

The generalized alignment process begins with storing the difference between the exponents in the shift control register. As usual, if a negative number would have been stored, that number is negated before storing and the contents of the register blocks are exchanged. Each bit of the shift control register is checked (from the most significant bit to the least significant bit). If bit I (where I is an integer ranging from J to 0) is equal to one, the right shifting circuitry performs one of three actions depending on the value of I. If I is greater than M+1, any attempt to right shift the significant by $2^I$ bits would be lengthy operation which results in an under flow. Thus, in these circumstances, the right shifting circuitry sets each bit of the significant to zero. If I is equal to M+1, the right shifting circuit twice right shifts the significant by $2^M$ bits. If I is less than or equal to M, the right shifting circuitry right shifts the significant by $2^M$ bits.

While certain embodiments of the invention have been described and illustrated above, the invention is not limited to these specific embodiments as numerous modifications, changes and substitutions of equivalent elements can be made without departing from the spirit and scope of the invention. Accordingly, the scope of the present invention is not to be considered as limited by the specifics of the particular structures which have been described and illustrated, but is only limited by the scope of the appended claims.

What is claimed as new and desired to be protected by Letters Patent of the United States is:

1. A processing element having support for alignment of significants, comprising:
    a first register block, said first register block including at least one first register for holding a first exponent and a first significant of a first floating point number;
    a second register block, said second register block including at least one second register for holding a second exponent and a second significant of a second floating point number and a second logic, said second logic capable of right shifting the significant of the second floating point number and said second logic also being capable of setting to zero each bit in a portion of said second significant to zeros;
    a shift control register;
    an arithmetic logic unit coupled to said first register block, said second register block, and said shift control register, said arithmetic logic unit storing in the shift control register a value equal to the difference between said first exponent and said second exponent, said arithmetic logic unit causing the second logic to right shift the significant or set to zero each bit in the portion of the significant, based upon the contents of said shift control register.

2. The processing element of claim 1, wherein the second logic is capable of right shifting the second significant by $2^N$ bits, wherein N is an integer which ranges from zero to M, where M is a positive integer of at least 3.

3. The processing element of claim 2, wherein if bit J of said shift control register is equal to one, and if J is greater than M+1, the portion corresponds to the $2^J$ most significant bits of said second significant, and said arithmetic logic unit causes the second logic to set to zero each bit in said portion, or if the second significant is less than $2^J$ bits, the arithmetic logic unit causes the second logic to set to zero each bit of said second significant.

4. The processing element of claim 2, wherein if bit J of said shift control register is equal to one, and if J is equal to M+1, the arithmetic logic unit causes the second logic to twice right shift said second significant by $2^M$ bits.

5. The processing element of claim 2, wherein if bit J of said shift control register is equal to one, and if J is less than or equal to M, the arithmetic logic unit causes the second logic to right shift said second significant by $2^J$ bits.

6. The processing element of claim 2, where if bit J of said shift control register is equal to one,
    if J is greater than M+1, then the portion corresponds to the $2^J$ most significant bits of said second significant, and said arithmetic logic unit causes the second logic to set to zero each bit in said portion, or if the second significant is less than $2^J$ bits, the arithmetic logic unit causes the second logic to set to zero each bit of said second significant; or
    if J is equal to M+1, the arithmetic logic unit causes the second logic to twice right shift said second significant by $2^M$ bits; or
    if J is less than or equal to M, the arithmetic logic unit causes the second logic to right shift said second significant by $2^J$ bits.

7. The processing element of claim 6, wherein M is equal to 3.

8. The processing element of claim 7, wherein J is equal to 0.

9. The processing element of claim 7, wherein J is equal to 1.

10. The processing element of claim 7, wherein J is equal to 2.

11. The processing element of claim 7, wherein J is equal to 3.

12. The processing element of claim 7, wherein J is equal to 4.

13. The processing element of claim 7, wherein J is equal to 5.

14. The processing element of claim 7, wherein J is equal to 6.

15. The processing element of claim 7, wherein J is equal to 7.

16. The processing element of claim 1, wherein if the value is negative, the arithmetic logic unit causes the content of said first register block to be exchanged with the content of said second register block, and the arithmetic logic unit negatives the value before storing the value in the shift control register.

17. A massively parallel processing system, comprising:
a main memory;
an array of processing elements, each processing element of the array being coupled to said main memory and other processing elmeents of said array, wherein each of said processing elements comprises,
a first register block, said first register block including at least one first register for holding a first exponent and a first significant of a first floating point number;
a second register block, said second register block including at least one second register for holding a second exponent and a second significant of a second floating point number and a second logic, said second logic capable of right shifting the significant of the second floating point number and said second logic also being capable of setting to zero each bit in a portion of said second significant to zeros;
a shift control register;
an arithmetic logic unit coupled to said first register block, said second register block, and said shift control register, said arithmetic logic unit storing in the shift control register a value equal to the difference between said first exponent and said second exponent, said arithmetic logic unit causing the second logic to right shift the significant or set to zero each bit in the portion of the significant, based upon the contents of said shift control register.

18. The massively parallel processing system of claim 17, wherein the second logic is capable of right shifting the second significant by $2^N$ bits, wherein N is an integer which ranges from zero to M, where M is a positive integer of at least 3.

19. The massively parallel processing system of claim 18, wherein if bit J of said shift control register is equal to one, and if J is greater than M+1, the portion corresponds to the $2^J$ most significant bits of said second significant, and said arithmetic logic unit causes the second logic to set to zero each bit in said portion, or if the second significant is less than $2^J$ bits, the arithmetic logic unit causes the second logic to set to zero each bit of said second significant.

20. The massively parallel processing system of claim 18, wherein if bit J of said shift control register is equal to one, and if J is equal to M+1, the arithmetic logic unit causes the second logic to twice right shift said second significant by $2^M$ bits.

21. The massively parallel processing system of claim 18, wherein if bit J of said shift control register is equal to one, and if J is less than or equal to M, the arithmetic logic unit causes the second logic to right shift said second significant by $2^J$ bits.

22. The massively parallel processing system of claim 18, where if bit J of said shift control register is equal to one, if J is greater than M+1, then the portion corresponds to the $2^J$ most significant bits of said second significant, and said arithmetic logic unit causes the second logic to set to zero each bit in said portion, or if the second significant is less than $2^J$ bits, the arithmetic logic unit causes the second logic to set to zero each bit of said second significant; or if J is equal to M+1, the arithmetic logic unit causes the second logic to twice right shift said second significant by $2^M$ bits; or if J is less than or equal to M, the arithmetic logic unit causes the second logic to right shift said second significant by $2^J$ bits.

23. The massively parallel processing system of claim 18, wherein M is equal to 3.

24. The massive parallel processing system of claim 23, wherein J equals 0.

25. The massive parallel processing system of claim 23, wherein J equals 1.

26. The massive parallel processing system of claim 23, wherein J equals 2.

27. The massive parallel processing system of claim 23, wherein J equals 3.

28. The massive parallel processing system of claim 23, wherein J equals 4.

29. The massive parallel processing system of claim 23, wherein J equals 5.

30. The massive parallel processing system of claim 23, wherein J equals 6.

31. The massive parallel processing machine of claim 23, wherein J equal 7.

32. The massively parallel processing system of claim 17, wherein if the value is negative, the arithmetic logic unit causes the content of said first register block to be exchanged with the content of said second register block, and the arithmetic logic unit negatives the value before storing the value in the shift control register.

33. In a processing element having a first register block including at least one first register for holding a first exponent and a first significant of a first floating point number and a second register block including at least one second register for holding a second exponent and a second significant of a second floating point number, the processing element having a second logic for right shifting the second significant by $2^N$ bits, wherein N is an integer ranging from zero to M, wherein M is an integer of at least 3, a method for aligning the second significant, said method comprising the steps of:

(a) storing in a storage control register, a value, said value being equal to second exponent register subtracted from the first exponent register;

(b) for an integer J ranging from 0 to one less than the width of said shift control register in bits, if bit J of the storage control register equals one, and
    (1) if J is greater than M+1, setting each bit in the $2^J$ most significant bits of said second significant to zero, or setting each bit in the second significant to zero if said second significant is less than $2^J$ bits;
    (2) if J is equal to M+1, twice right shifting said second significant by $2^M$ bits; or,
    (3) if J is equal to or less than M, right shifting said second significant by $2^J$ bits.

34. The method of claim 33, further comprising the step of:

before step (a), if the value is a negative number, exchanging the contents of said first register block with said second register block; and negativing the contents of the storage control register.

35. The method of claim 33, wherein M is equal to 3.

36. The method of claim 35, wherein J is equal to 7.

* * * * *